United States Patent [19]

Flaxman

[11] 4,303,087

[45] Dec. 1, 1981

[54] AUTOMOBILE WASHING AND DRYING INSTALLATION

[76] Inventor: Michael Flaxman, 169 Sterling Rd., Harrison, N.Y. 10528

[21] Appl. No.: 86,413

[22] Filed: Oct. 19, 1979

[51] Int. Cl.³ .......................... B08B 3/02; B60S 3/04
[52] U.S. Cl. ................................ 134/58 R; 134/113; 134/123; 15/312 R
[58] Field of Search ............... 15/DIG. 2, 312 R, 405; 134/45, 123, 58 R, 113

[56] References Cited

U.S. PATENT DOCUMENTS

| | | | |
|---|---|---|---|
| 2,440,157 | 4/1948 | Rousseau | 134/123 X |
| 2,583,703 | 1/1952 | Morison | 134/123 X |
| 2,689,577 | 9/1954 | Dunn et al. | 134/123 |
| 3,085,351 | 4/1963 | Hurst | 134/45 X |
| 3,102,545 | 9/1963 | Knight et al. | 134/45 |
| 3,258,019 | 6/1966 | Bellas et al. | 134/123 X |
| 3,324,868 | 6/1967 | Kaufman | 134/123 |
| 3,351,076 | 11/1967 | Haines | 134/123 X |
| 3,442,027 | 5/1969 | Hurwitz | 15/405 X |
| 3,506,020 | 4/1970 | DeNiro | 134/45 |
| 3,726,293 | 4/1973 | Padek | 134/45 |

FOREIGN PATENT DOCUMENTS

| | | | |
|---|---|---|---|
| 2310848 | 12/1973 | Fed. Rep. of Germany | 134/45 |
| 2439067 | 6/1975 | Fed. Rep. of Germany | 134/123 |
| 2746196 | 4/1979 | Fed. Rep. of Germany | 134/113 |
| 1110000 | 4/1968 | United Kingdom | 134/123 |

*Primary Examiner*—Robert L. Bleutge

*Attorney, Agent, or Firm*—Posnack, Roberts, Cohen & Spiecens

[57] ABSTRACT

A car washer and dryer installation in which a shroud is suspended from a frame and is controlled to be lowered and raised relative to an automobile which is to be washed and dried. A source of water and chemical cleaner is connected to the shroud and is selectively operated to enable a wetting operation to take place as the shroud is lowered during a first cycle and to enable chemical cleaner and water to be applied during the first cycle as the shroud is raised. Between the first cycle and a second cycle is provided an open period during which manual operations on the automobile may take place. Then, an alarm is sounded to indicate that the second cycle is about to take place whereafter the shroud is lowered and raised in order to rinse the car. A drying apparatus is applied in the form of a hood which may be raised by a piston assembly but which is otherwise permitted to rest on the automobile through the intermediary of a roller. A counterbalance is provided for the hood so that only a limited amount of weight is supported by the automobile. The supply of pneumatic drying medium through the hood may be manually or automatically controlled. The supply of water and chemical cleaner through the shroud is controlled by electronic relays which are also employed to control the lowering and raising of the shroud. The electronic relays are composed of Triacs which in turn are controlled by transistors connected to form appropriate switches.

14 Claims, 8 Drawing Figures

AUTOMOBILE WASHING AND DRYING INSTALLATION

FIELD OF INVENTION

This invention relates to automobile washing and drying installations and, more particularly, to apparatus for the automatic lowering and raising of automobile washing shrouds and for the automatic supply of water and chemical cleaners thereto.

BACKGROUND

Car washing establishments are known in which automobiles are passed through a series of stations. At these stations, a sequence of rinsing, washing and scrubbing operations take place as well as some ancillary operations such as waxing, tire cleaning and so forth.

Generally, these car washing establishments employ conveyor chains usually mounted in channels in the floor. These conveyor chains provide automobile mobility for transporting automobiles at fixed speeds through the aforesaid stations.

Not only are these conveyor installations expensive to manufacture and to install, but they moreover extend along a relatively large expanse. Therefore, the buildings in which they are housed have to be of rather great size.

There are numerous instances in which automobiles have to be washed in relatively large numbers but in which room for a sequence of stations or an extended conveyor is not available. For example, in new car agencies, provision has to be made for washing new cars as they come in, but usually space is not available for the usual car washing installation. A taxi-barn is another situation in which a large number of vehicles may have to be washed in a relatively small space. Military establishments, trucking companies, bus companies and so forth are additional examples of situations in which conventional car washing arrangements may not be suitable.

SUMMARY OF INVENTION

It is an object of the invention to provide an improved automobile washing and drying installation.

It is another object of the invention to provide an improved automobile washing and drying installation which can be installed in a relatively small space.

It is a further object of the invention to provide an improved washing and drying installation which can be used for a variety of objects and which can be installed at relatively low expense.

Still another object of the invention is to provide an improved washing and drying installation which can permit the washing of a relatively large number of objects with one operator.

It is a further object of the invention to provide an improved installation for new car preparation and the like.

Yet another object of the invention is to provide for the reducing of the cost of new and used car preparation by substantial amounts.

Still another object of the invention is to provide for optimum use of chemical cleaners and the like and to otherwise improve efficiency and production.

Still another object of the invention is to provide for conserving capital expenditure in the installation and maintenance of automobile washing and drying apparatus.

Other objects of the invention relate to the provision of installations which will not break antennae and other appendages on automobiles as they are being washed, which will not leave swirl marks on new car finishes and the like, which will fit into a bay as small as ten feet by twenty two feet and even smaller, which will give trouble free operation and thereby reduce down time, and which will permit the use of a number of accessories such as white wall guns, high pressure water guns, air guns, and the like.

In achieving the above and other objects of the invention, there is provided an apparatus for washing an object resting on a supporting surface, said apparatus comprising spray means for discharging a cleaning fluid against said object, raising and lowering means for raising and lowering said spray means along said object, cleaning fluid source means coupled to said spray means to supply cleaning fluid to the latter, drying means for directing a drying medium against said object, and control means to control the application of said drying medium to said object.

The aforesaid drying means may be constituted by a hood adapted to rest against the object to be washed, pivot means pivotally supporting said hood, counterbalance means coupled to said hood to minimize the force of the hood against said object, and pneumatic medium source means coupled to said hood to supply pneumatic medium to the same.

In addition to the aforesaid, there may be provided a flexible conduit coupling said pneumatic medium source to said hood. A roller may, moreover, be employed on said hood for engaging against the object to be washed. The pivot means may include parallel arms connected to said hood and pivots supporting said arms, said counterbalance means including at least one counterweight bar extending across said arms. Piston means may be provided for removing said drying means away from said object, said piston means being coupled to said arms.

In accordance with the invention, a frame may be provided supporting said piston means and supporting the aforesaid pivots above the surface and object. The spray means mentioned above may include a shroud suspended from said frame and adapted for at least partly encircling the aforesaid object. The raising and lowering means may include lines connected to said shroud and pulleys on said frame and guiding said lines.

In accordance with another feature of the invention, the aforesaid raising and lowering means may include a double acting piston coupled to said lines for raising and lowering the shroud. The shroud may be in the form of a loop of hollow tubing provided with holes for the discharge of said cleaning fluid. The cleaning fluid source means mentioned above may include sources of water and chemical cleaner and hoses connecting the latter said sources to said hollow tubing.

According to another feature of the invention, there may be provided control means coupled to the double acting piston to actuate the same, said control means also controlling said sources of water and cleaner so that, in a first cycle, the shroud sprays the object with water while being lowered around the object and with water and cleaner while being raised around the object. Said control means may, furthermore, include alarm means and may initiate a second cycle, after a rest period, during which the shroud sprays the object with water while being lowered and raised with respect to the same, said alarm means being actuated upon the start of the second cycle.

According to still another feature of the invention, said control means may include electronic relays for controlling said sources of water and cleaner and said alarm means. These relays may each comprise an AC voltage source and a Triac including a control lead and responsive to signals thereon for selectively presenting a high or low impedance to said voltage source, PNP and NPN transistors coupled together to form a switch and coupled to the control lead of said Triac to provide said signals, diodes, two further transistors coupled to each other and through said diodes to said PNP and NPN transistors, respective of said further transistors functioning with respective of the first said transistors during respective of the positive and negative portions of the AC voltage of the AC voltage source for selectively coupling the AC voltage source through said Triac, said Triac being coupled to said water and cleaner sources and said alarm means.

The above and other objects, features and advantages of the invention will be found in the detailed description which follows hereinafter as illustrated in the accompanying drawing.

DETAILED DESCRIPTION

In accordance with the invention, there is provided an apparatus for washing an object such as a car resting on a supporting surface such as a floor. This apparatus, in accordance with the invention, comprises a spray means for discharging a cleaning fluid against the automobile and raising and lowering means for raising and lowering the spray means vertically relative to and along the automobile. A cleaning fluid source means is coupled to the spray means to supply cleaning fluid to the latter. In further accordance with the invention, a drying means is provided for directing a drying medium against the automobile, and a control means is provided to control the application of said drying medium to the automobile.

Figure 1:
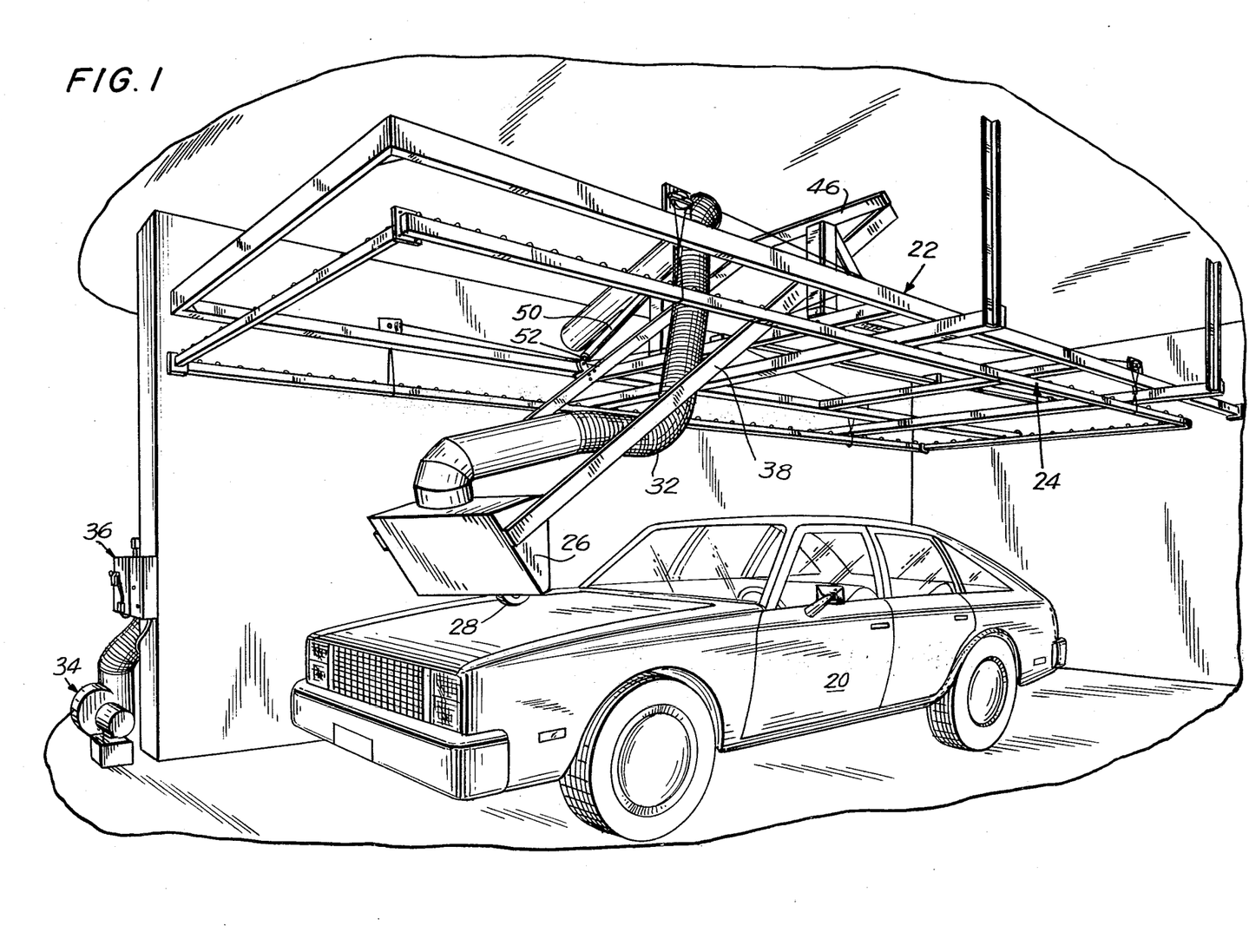
FIG. 1 is a perspective view of an automobile washing and drying installation provided in accordance with the invention.

An apparatus of the above indicated type intended to be installed in a relatively small bay or space is illustrated in FIG. 1 wherein is seen the automobile 20. Mounted above the automobile is a frame generally indicated at 22, this frame having suspended therefrom a shroud or frame 24 which is adapted to be lowered around the automobile in encircling relationship thereto and subsequently raised from the lowered position.

Shown resting on the front of the automobile is a drying hood 26 in generally triangular form and adapted to discharge a pneumatic drying medium against the automobile. The hood in effect rests on the automobile when permitted to do so and engages the automobile through the intermediary of a roller 28.

At the top of the hood is affixed a metal cylinder 30 to which is attached a flexible conduit 32. The flexible conduit 32 is connected to a blower apparatus indicated generally at 34. The blowing apparatus 34 is under the control of a control 36 which may be of manual or automatic type.

The hood 26 is supported on parallel arms 38. These arms are pivotally held by pivots (not shown) mounted on the frame 22. In order to minimize the force which the hood exerts on the automobile, the weight of the hood and the parts attached thereto is counter-balanced by a set of one or more counterweight bars 46 mounted transversely between the arms 38.

A bar 48 also extends between the arms 38, 40, 42 and 44 on the hood side of the aforesaid pivots. This bar 48 is engaged by the rod 50 of a piston 52 which can be actuated to withdraw the hood 26 away from the vehicle when the automobile is to be driven away and possibly replaced by a subsequent vehicle to be cleaned and dried.

Figure 2:
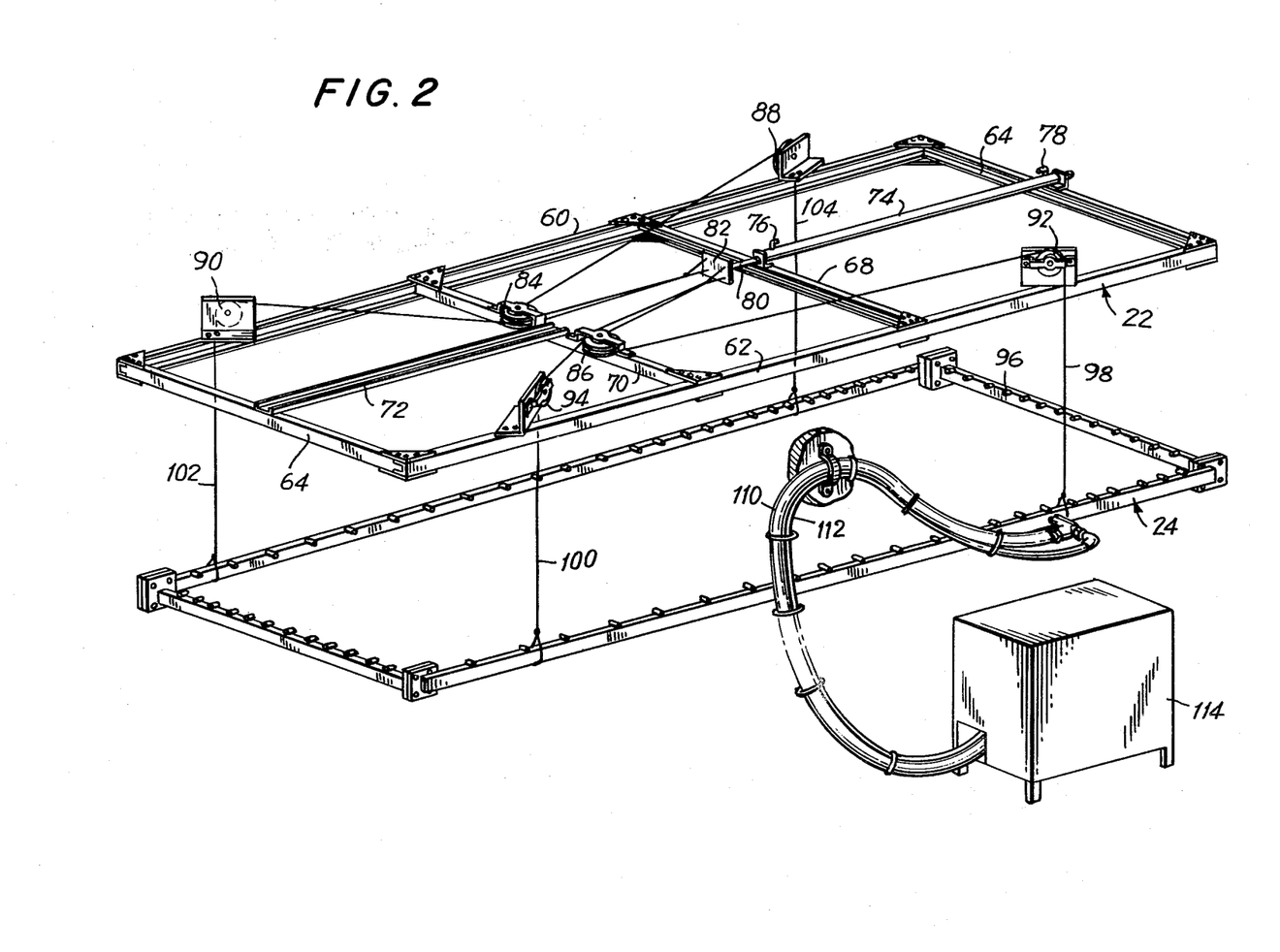
FIG. 2 is a perspective view of a frame and suspended shroud similar to the washing apparatus illustrated in FIG. 1 but omitting the drying apparatus for purposes of clarity.

FIG. 2 more clearly illustrates the relationship of the suspending frame 22 and the suspended shroud 24. In FIG. 2 only a simplified portion of the frame 22 is illustrated. By way of example, this frame 22 is of rectangular form including side beams 60 and 62 and transverse end beams 64 and 66. Two additional transverse beams 68 and 70 are illustrated, there being, for example, a reinforcing beam 72 extending longitudinally along the center line of the frame between end beam 64 and transverse beam 70.

Mounted between the end beam 64 and transverse beam 68 is a double acting piston 74. This piston has two inlet-outlet fixtures 76 and 78 whereby operation of the piston rod 80 in either of two opposite and reciprocal directions is possible. Attached to the free end of the piston rod 80 is the connector plate 82.

Mounted on the transverse beam 70 are two pulleys 84 and 86. Mounted on side beam 60 are two further pulleys 88 and 90. A further two pulleys 92 and 94 are mounted on side beam 62. The pulleys are angularly disposed.

The shroud 24 consists of a rectangular loop of hollow tubing which is perforated or supplied with a multitude of openings 96 by way of which the shroud discharges fluid against the object to be washed. The shroud 24 is as mentioned above suspended from the frame 22. This is effected by means of lines 98, 100,102 and 104. All of these lines are guided by respective of the aforesaid pulleys or wheels or combinations of the same to their points of attachment to the aforesaid plate 82. By reason of the attachment of these lines to the plate 82 which is attached to the piston rod 80, action of the piston 74 permits the shroud to be lowered and subsequently raised depending on whether air is supplied to the fixture 76 or the fixture 78.

In addition to the aforesaid, two hoses 110 and 112 are connected to the shroud 24. One of these hoses is intended to carry water to the shroud and the other is intended to convey chemical cleaner or soap to the shroud. Which of these fluids is fed to the shroud and the times at which the supply of these fluids is effected is controlled by means of components and circuitry within the control cabinet 114.

Figure 3:
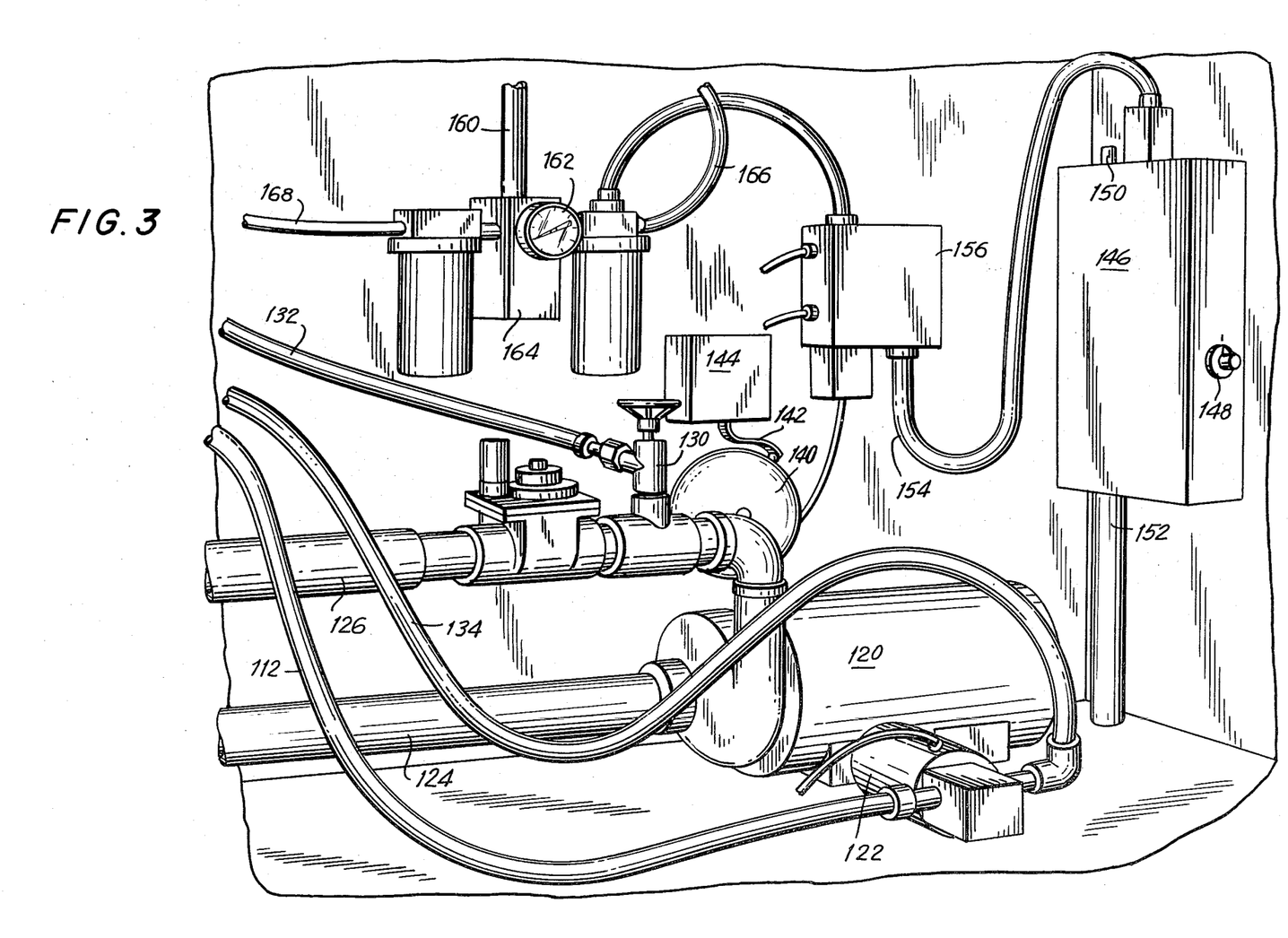
FIG. 3 is a view of the shroud controls with the exception of the electronic circuitry.

FIG. 3 illustrates the contents of the control cabinet 114. Therein is shown a water pump 120 and a soap or chemical cleaner pump 122. Water is fed to the pump 120 via line 124 and is pumped out of the pump 120 to the aforesaid shroud via line 126. In the line 126 is incorporated a valve 128, the control of which is described hereinafter. Valve 128 controls whether or not water can be pumped via line 126 to the shroud. Also mounted on the line 128 is a manually controlled tap 130 which controls the supply of fluid via a line 132. This permits ancillary operations such as via a manually controlled gun for purposes of cleaning white wall tires or the like.

Soap or chemical cleaner is supplied via a line 134 from a drum or other such source (not shown). Soap or chemical cleaner is supplied by pump 122 to the shroud via a line 112 mentioned hereinabove. Line 126 for water is coupled to the above mentioned line 110.

An alarm or bell is indicated at 140. It is operated by a hammer 142 in turn operated by a control box 144. The control of pumps 120 and 122 as well as alarm 140 is controlled by a timer box 146 and the circuitry contained therein as will be described hereinafter. A soap or chemical cleaner demand adjusting knob is indicated at 148 and a fuse is indicated at 150. Power is supplied via conduit 152 and various electrical connections are made via line 154 feeding into a junction box 156.

Air for operation of the double acting piston mentioned hereinabove is supplied via line 160 and regulator 162. Its distribution is controlled by solenoid 164 which controls the supply of air to one end or the other of the above mentioned double acting piston via lines 166 and 168.

Figure 4A:
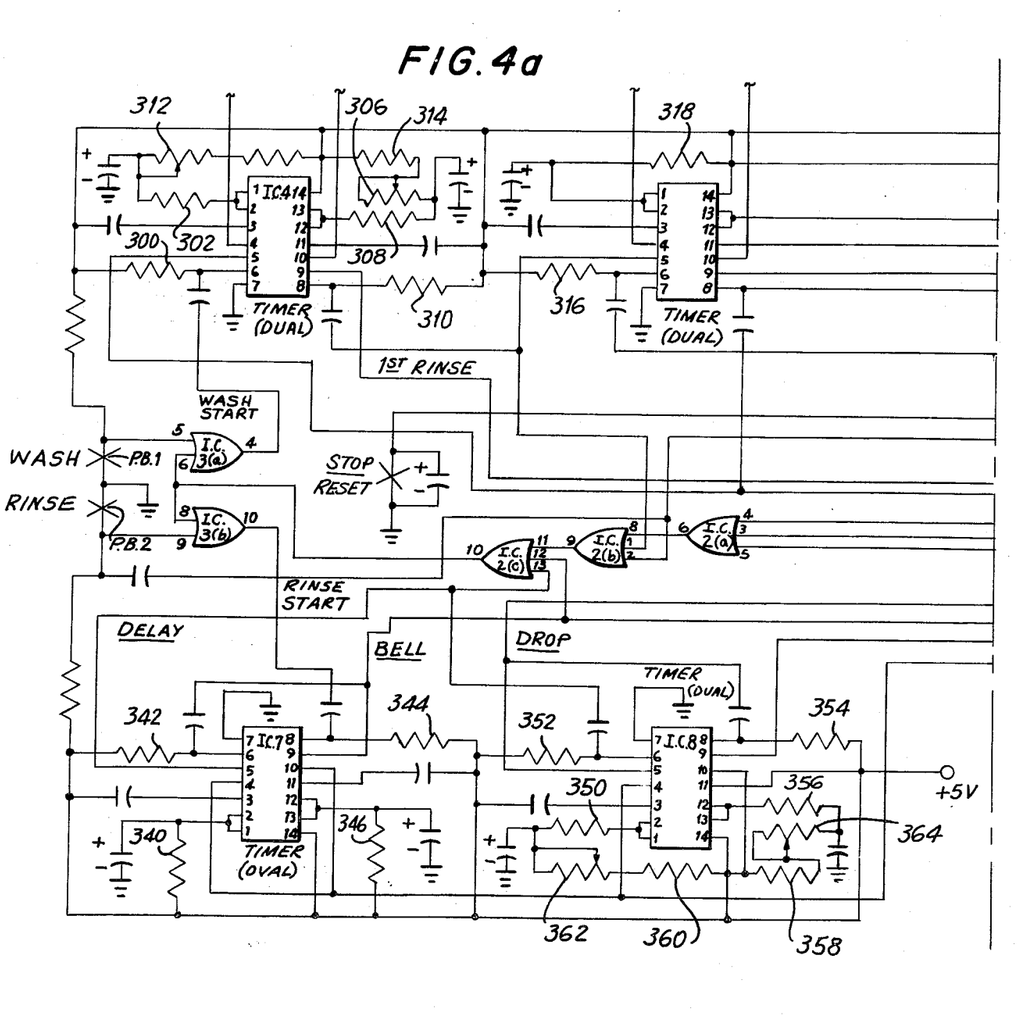
FIGS. 4a and 4b are diagrams of the electronic circuitry employed for the control of the aforesaid apparatus.
Figure 4B:
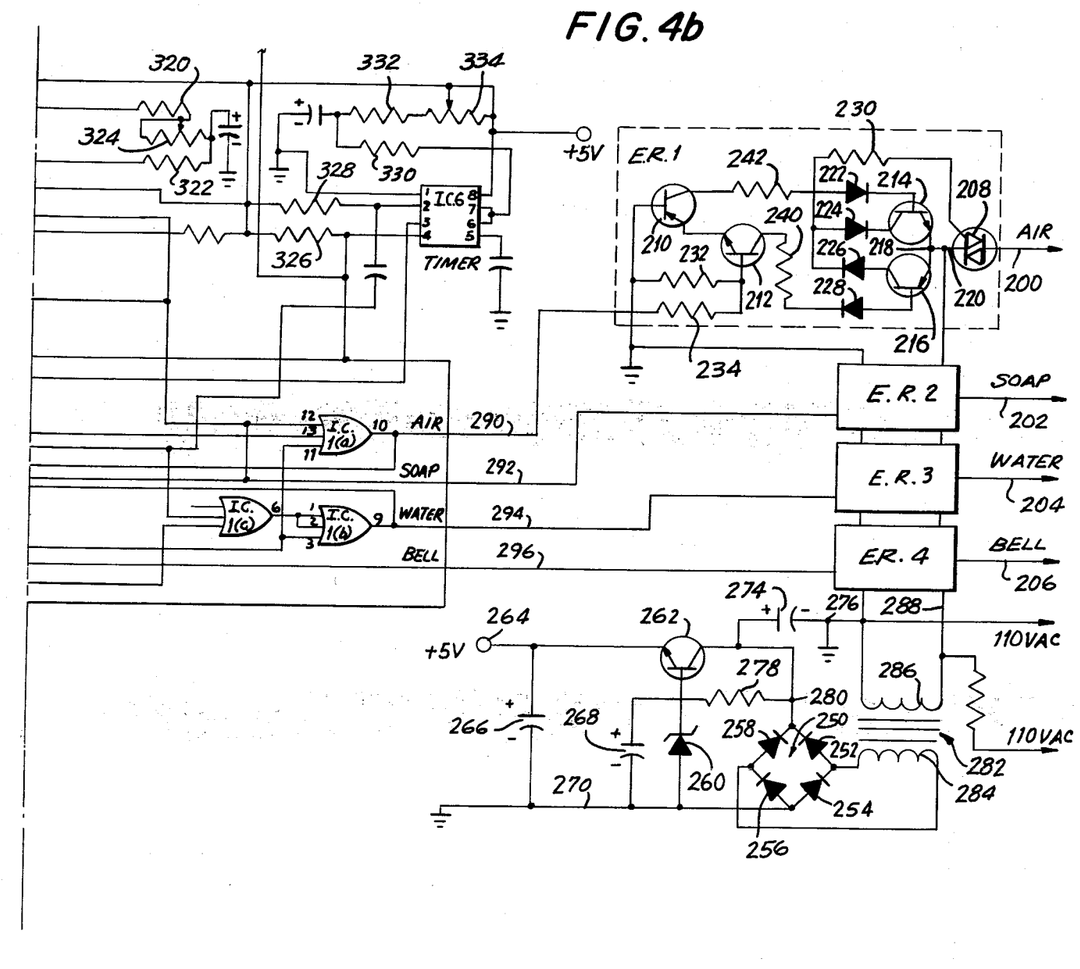

FIG. 4 is a schematic diagram of the timer and control circuitry employed in conjunction with the aforegoing apparatus. It will be more particularly noted that there are four output lines 200, 202, 204 and 206. These output lines respectively carry signals controlling the application of air to the double acting piston which controls the lowering and raising of the shroud, the application of soap or chemical cleaner, the application of water, and the initiation of the alarm or actuation of the bell. These lines are also respectively connected to electronic relays E.R. 1, E.R. 2, E.R. 3 and E.R. 4. Each of the above-indicated electronic relays is composed of the same components including specifically a Triac 208 and transistors 210, 212, 214 and 216 each including a base, a collector and an emitter. The transistors 214 and 216 are PNP and NPN types and are connected together at a junction 218 connected to the control lead 220 of the Triac 208. A plurality of diodes 222, 224, 226 and 228 are employed to couple the transistors 210 and 212 to the transistors 214 and 216. Resistors 230, 232 and 234 are connected to respective of the transistors.

The electronic relays constitute a feature of the invention in accordance with which a 110 volt AC voltage is switched at relatively high currents of up to 8 amps. The circuit is of extremely high gain and can be powered from CMOS voltage and currents. The circuit is capable of driving highly inductive or capacitive loads such as solenoid coils and the like.

An input signal in connection with the electronic relays is applied for example through resistor 234 to transistor 212 which in turn applies a negative voltage to the base of transistor 216 through diode 228. Transistor 212 obtains current from its emitter circuit from transistor 210 with which transistor 212 has a common base circuit. The base of transistor 210 is grounded. The emitter-base junction of transistor 210 is forward biased. Transistors 214 and 216 have their emitters connected to junction 218. The voltages of these emitters will be either positive or negative relative to ground at any given time. During the positive portion of the AC voltage to be switched, transistor 216 is active and during the negative portion of this voltage transistor 214 is active. In the positive cycle, the transistor 216 will have its emitter-base junction forward biased through resistor 240 to the collector of transistor 212. If transistor 212 is on due to a positive voltage on its base then, for example, transistor 216 will turn on.

On the negative cycle, the emitter-base junction of transistor 214 will be forward biased and connected via diode 222 and resistor 242 to the collector of transistor 210. If transistor 210 is on due to a forward bias on its emitter-base junction, then transistor 214 will turn on. It can thus be seen that, from a single positive input on the base of transistor 212, transistors 210, 212, 214 and 216 will turn on. Since transistors 214 and 216 are PNP, NPN combinations and since their collectors are tied together through the aforementioned protective diodes, an AC switch is derived.

When transistors 214 and 216 are turned on, an AC current is applied to the control lead 220 of Triac 208 which is a well known SCR device. The Triac will respond by changing to a low impedance allowing the 110 volt power source to be connected to an output. This application of "in face" lower means control to the gate of the Triac will keep the Triac on with highly inductive loads. Additionally, this circuit can turn the Triac on at any time including virtual zero crossing. Thus, the voltage source can be switched on starting at any quadrant.

The power source, which is coupled to the output lines 200, 202, 204 and 206 selectively, includes a rectifier bridge 250 including rectifiers 252, 254, 256 and 258. A Zener diode 260 is included in the circuit and is coupled to transistor 262 which may be, for example, a 2N 4921 whose emitter is connected a +5 volt terminal 264. Capacitors 266 and 268 are connected from the terminal and from the transistor 262 to ground via line 270.

The collector of transistor 262 is connected via capacitor 274 to ground at junction 276. The base of the transistor 262 is connected via resistor 278 and junction 280 to the rectifier bridge 250. Transformer 282 has a winding 284 connected across the rectifier bridge 250 and winding 286 connected to output line 288 and thence to the aforesaid electronic relays 1–4 which selectively switch the output on line 288 to couple the same to the output lines 202, 204, 206 and 200.

It will be noted with respect to the electronic relays that transistors 210 and 216 thereof may be, for example, MPS-A93 types whereas transistors 212 and 214 may be, for example, MPS-A43 types. Triac 208 may be a Teccor Q200 3L4.

It will be noted that the electronic relays are fed input signals via lines 290, 292, 294 and 296. Supplying an input signal to line 290 is gate I.C.1(a). Gate I.C. 1(b) supplies an input signal to line 294. The input signal on line 298 is received from terminal 9 of timer I.C. 7 which unless otherwise specified is with the balance of the timers described with respect to this circuit constituted by an NE 556. It will be noted that there are additional such timers in the circuit these being indicated at I.C. 4, I.C. 5 and I.C. 8. One additional timer which may be, for example, an NE 555 is indicated at I.C. 6. Additional gates are indicated at I.C. 1(c), I.C. 2(a), I.C. 2(b) and I.C. 2(c). The input terminals of gate I.C. 1(a) are indicated at 11, 12 and 13. The input terminals of gate I.C. 2(b) are indicated at terminals 3,4 and 5, whereas the input terminals of gate I.C. 2(b) are indicated at 1,2 and 8. The input terminals of gate I.C. 2(c) are indicated at 11, 12 and 13. Also included in the circuit are gates I.C. 3(b) having input terminals 6 and 9 and gate I.C. 3(b) having input terminals 8 and 9. The circuit moreover includes a wash push-button P.B. 1 and a rinse push-button P.B. 2.

To the timer I.C. 4 are connected resistors 300, 302 304, 306, 308 and 310 as well as potentiometers 312 and 314. To the timer I.C. 5 are connected resistors 316,318, 320 and 322 as well as potentiometer 324.

To the timer I.C. 6 are connected resistors 326,328, 330, and 332 as well as potentiometer 334. To the timer I.C. 7 are connected resistors 340,342,344 and 346. To the timer I.C. 8 are connected resistors 350,352, 354, 356, 358 and 360 as well as potentiometers 362 and 364.

The hard wired circuitry illustrated in FIGS. 4(a) and 4(b) provide for automatically determining a predetermined routine to enable the washing of automobiles or trucks or the like of various sizes and types. The timing of the actual events of mechanical motion to create the function of washing include the application of air, water, chemical cleaner and an alarm. This is enabled by power supplied from a conventional emitter follower circuit with the inclusion of a Zener diode.

Depressing the wash push-button P.B. 1 will activate timer I.C. 4 through gate I.C. 3(b). The output from timer I.C. 4 will go to a logic high and through gate I.C. 1(a) onto a logic lead supplying air to make the shroud drop, this in turn causing an output from I.C. 1(a) which operates electronic relay E.R. 1.

The logic lead controlling drop is connected also to pin 3 of gate I.C. 1(c), the output of which appears such that it is applied to input terminals 1 and 2 of gate I.C. 1(b). The output from gate I.C. 1(b) appears on line 294 and is adapted to operate electronic relay E.R. 3.

The above logic provides for the normal operation of a given function in which electronic relays E.R. 1 and E.R. 3 operate the air and water control signals within the control cabinet 114.

The timers I.C. 4–8 allow for discrete times as, for example, as follows:
1. Wash Sequence:
    a. drop time (air and water)—6.5–23.5 seconds.
    b. soap or chemical cleaner time (soap or chemical cleaner only)—0 to 8.5 seconds.
    c. dwell time (no action)—5 seconds.
    d. first rinse (water only) 8 to 25 seconds.
2. Manual Wash Sequence:
    a. 0–6 minutes during which an operator can perform various operations on the object being washed.
3. Rinse Sequence:
    a. bell time (bell only)—2 seconds.
    b. wait time (no action)—3 seconds.
    c. second drop time (air and water)—6.5 to 23.5 seconds.
    d. second rinse time (water only)—20 to 36 seconds.

In addition to the above, gate I.C. 2 provides for a monitoring of all timing functions to inhibit gates I.C. 3(a) and (b) with a busy line signal. The busy line signal disallows incorrect operator control such as, for example, the depressing of wash or rinse push-buttons P.B. 1 or P.B. 2 out of sequence which would thereby cause malfunctioning of the machine.

In addition to the above, a reset push-button P.B. 3 is provided to terminate all operation of the machine and cause it to go to a normally idle condition without removing power. This push-button is provided as a safety measure.

Figure 5:
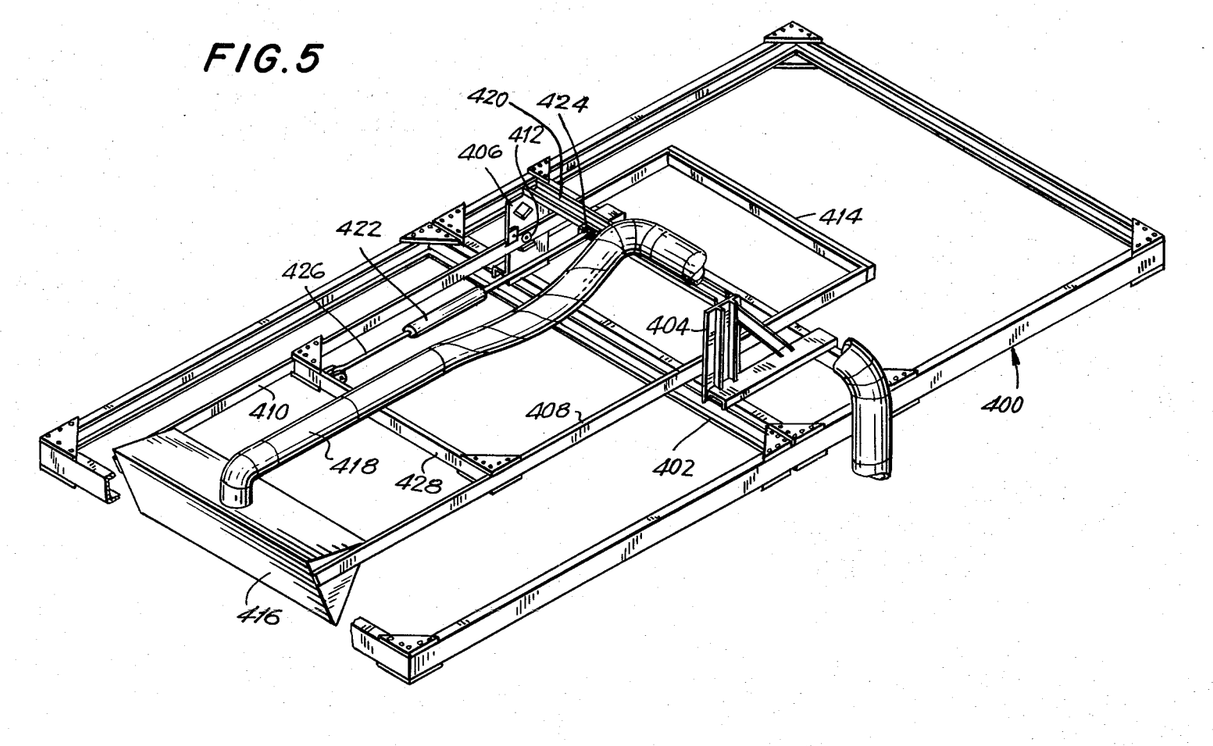
FIG. 5 is an isometric view of a variation of the dryer means illustrated in FIG. 1.

FIG. 5 illustrates a variation of the structure supporting the drying hood of FIG. 1. More particularly, there is illustrated a frame 400 having a transverse beam 402 on which are mounted two vertical beams 404 and 406. Two longitudinally disposed arms 408 and 410 are pivoted to the vertical beams 404 and 406 as indicated by way of example at 412. Extending between arms 408 and 410 are counterbalance weights 414.

Hood 416 is supported between arms 408 and 410 and connected thereto is a flexible conduit 418 via which a drying medium is fed to the hood 416 for application against an object to be dried such as an automobile.

Mounted on the frame 400 is a transverse beam 420 to which is pivotally connected a piston 422 (diagrammatically illustrated) by means of a pivotal connection 424. The piston rod 426 of the cylinder 422 is connected to transverse beam 428 connected between arms 408 and 410. Operation of the cylinder/piston combination 422 is effective to tilt the hood 416 on arms 408 and 410 around pivots 412 against the weight of counterbalance weights 414. Thereby, the hood 416 can be applied against an automobile or the like by pressure supplied to cylinder 422 with the counter-weights 414 operating on the dumping of the pressure medium from cylinder 422 to pivot hood 416 upwards to the position shown whereby the hood is withdrawn from the object being dried.

Figure 6:
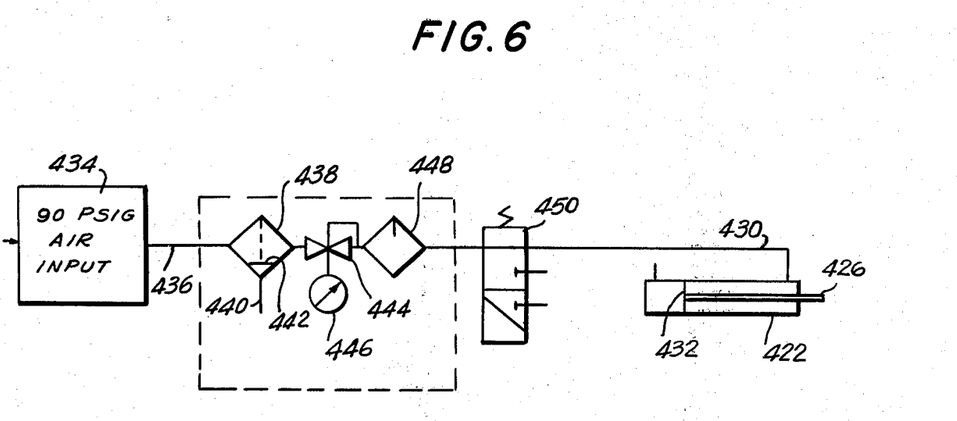
FIG. 6 is a schematic view of the pneumatic system employed for displacing the hood in the apparatus of FIGS. 1 and 5.

FIG. 6 diagrammatically illustrates the cylinder 422 and the piston rod 426 extending therefrom. Leading to the cylinder 422 is a line 430 for the conveyance of pressure medium to the cylinder 422 in which is indicated the piston 432. The pressure medium originates in the source 434 which feeds via line 436 to the filter 438. The purpose of the filter 438 is to remove condensation and the like from the pneumatic medium passing there through. A line 440 is indicated which, in conjunction with dump control, enables the drainage of condensation and the like from the filter 438.

At 444 is indicated a pressure regulator, the gauge for which appears at 446. Element 448 is a lubricator for introducing oil mist into the pressure medium for transmission to the cylinder 422. The component 448 is connected to the cylinder 422 via valve 450 which provides for flow of the pressure medium via line 430 to the cylinder 422 or for a dumping of the pressure medium therefrom whereby the piston 432 can return to its position of rest.

Figure 7:
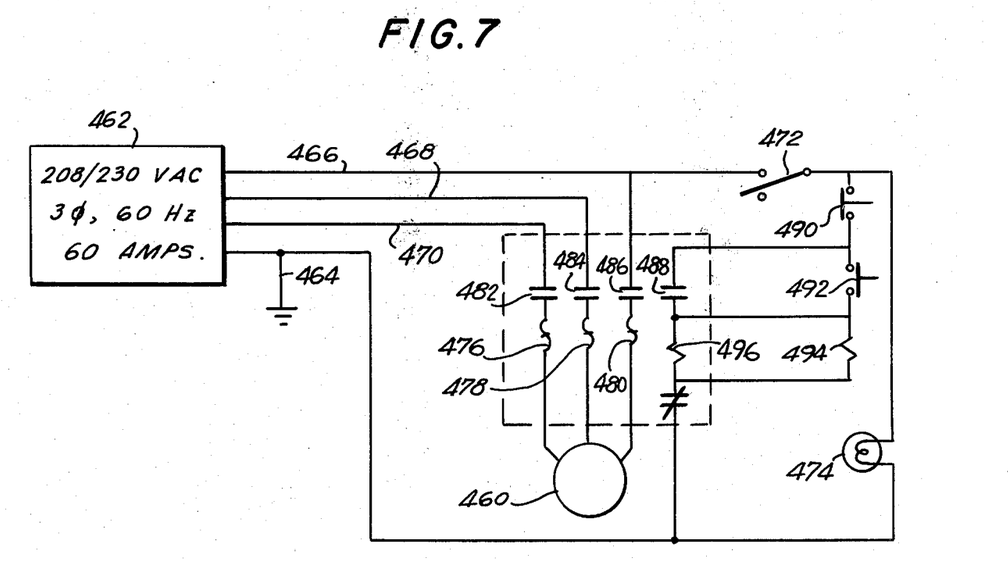
FIG. 7 is a schematic view of the electrical circuitry employed for operating the controls for the drying means of FIGS. 1 and 5.

FIG. 7 indicates that the apparatus comprises a blower 460 for supplying drying medium to the hood 416 of FIG. 5 or 26 of FIG. 1. The blower operates off a three-phase source of electrical power indicated at 462, there being a ground indicated at 464 and three power lines 446, 468 and 470. A switch 472 controls the coupling of power to the control arrangement and the connection of the power to the control arrangement is indicated by lamp 474.

To the blower 460 are connected thermal overload contacts 476, 478 and 480, these in turn being connected to contact sets 482, 484 and 486. An additional set of contacts is indicated at 488.

A normally on switch is connected to switch 472 and is indicated at 490. This switch is connected in parallel to a normally off switch indicated at 492. To the switch 492 are connected the control coil 494 and relay coil 496. The relay coil 496 controls sets of contacts 482, 484, 486 and 488. The control coil 494 controls the valve 450 mentioned hereinabove with respect to FIG. 6. It will be noted that the relay coil 496 is moreover connected through the set of contacts 488 to the normally on switch 490.

To commence operations switch 472 is closed thereby bringing power to the lamp 474 and to the normally on switch 490. When subsequently the switch 492 is closed, power is brought to relay coil 496 and control coil 494 thereby operating valve 450 (FIG. 6). The energization of relay coil 496 causes the closing of sets of contacts 482, 484, 486 and 488, thereby commencing operation of the blower 460. Operation of contact set 488 maintains power on coils 494 and 496 despite the release of switch 492. This power supply arrangement continues until subsequently switch 490 is operated to open the same, whereby energization of coils 494 and 496 is discontinued and the power supply to the blower and to valve 450 is terminated.

There will now be obvious to those skilled in the art many modifications and variations of the apparatus and circuitry disclosed hereinabove. These modifications and variations will not depart from the scope of the invention if defined by the following claims.

What is claimed is:

1. Apparatus for washing an object resting on a supporting surface, said apparatus comprising a frame, spray means for discharging a cleaning fluid against said object, raising and lowering means connecting said spray means to said frame for raising and lowering said spray means, means for supplying cleaning fluid to the spray means, drying means supported by said frame for directing a drying medium against said object, and control means to control the application of said drying medium to said object, said drying means including a hood adapted to rest against said object, pivot means pivotally supporting said hood from said frame, counterbalance means coupled to said hood to counterbalance the weight of the hood and minimize the force of the hood against said object, and pneumatic medium source means coupled to said hood to supply pneumatic medium to the same, said pivot means including parallel arms connected to said hood and pivots supporting said arms from said frame, said counterbalance means including at least one counterweight bar extending across said arms, said spray means including a shroud suspended from said frame and adapted for at least partly encircling said object, piston means coupled to said frame and said hood for selectively displacing the hood relative to said object, a source of pressure medium for operating said piston means, and operating means for effecting a sequence of operations including lowering the shroud, supplying cleaning fluid to said shroud, supplying drying medium to said hood, actuating said piston means to raise said hood, and raising said shroud.

2. Apparatus as claimed in claim 1 comprising a flexible conduit coupling said pneumatic medium source means to said hood.

3. Apparatus as claimed in claim 1 comprising a roller on said hood for engaging against said object.

4. Apparatus as claimed in claim 1 wherein said raising and lowering means includes lines connected to said shroud and pulleys on said frame and guiding said lines.

5. Apparatus as claimed in claim 1 wherein said raising and lowering means further includes a double acting piston coupled to said lines for raising and lowering said shroud.

6. Apparatus as claimed in claim 5 wherein said shroud is a loop of hollow tubing provided with holes for the discharge of said cleaning fluid.

7. Apparatus as claimed in claim 6 wherein said cleaning fluid source means includes sources of water and chemical cleaner and hoses connecting the latter said sources to said hollow tubing.

8. Apparatus as claimed in claim 7 wherein said operating means comprises control means coupled to said double acting piston to actuate the same, said control means also controlling said sources of water and cleaner so that, in a first cycle, the shroud sprays the object with water while being lowered around the object and with water and cleaner while being raised around the object.

9. Apparatus as claimed in claim 8 wherein said control means includes alarm means and initiates a second cycle, after a rest period, in which the shroud sprays the object with water while being lowered and raised with respect to the same, said alarm means being actuated upon start of the second cycle.

10. Apparatus as claimed in claim 9 wherein said control means includes electronic relays for controlling said sources of water and cleaner and said alarm means, said relays each comprising an AC voltage source, a Triac including a control lead and responsive to signals thereon for selectively presenting a high or low impedance to said voltage source, PNP and NPN transistors coupled together to form a switch and coupled to the control lead of said Triac to provide said signals, diodes, two further transistors coupled to each other and through said diodes to said PNP and NPN to transistors, respective of said further transistors functioning with respective of the first said transistors during respective of the positive and negative portions of the AC voltage of the AC voltage source for selectively coupling the AC voltage source through said Triac, said Triac being coupled to said water and cleaner sources and said alarm means.

11. Apparatus as claimed in claim 1 wherein said frame supports said pivots above said surface and object.

12. Apparatus as claimed in claim 1 comprising valve means coupling said source to said piston means, blower means to supply said drying medium to said hood, and control means to actuate said blower means and valve means.

13. Apparatus as claimed in 12 wherein said control means includes a source of electric power, a normally on switch coupled to the source of electric power, a normally off switch coupled to the normally on switch, a valve control and a control coil coupled to said normally off switch, said normally on switch also being coupled to said control coil, said blower means including actuating contacts sets operated by said control coil, one of said actuating contact sets being interposed between said control coil and normally on switch, operation of said normally off switch actuating said blower means.

14. Apparatus as claimed in claim 13 comprising filter means between said source of pressure medium and said piston means and including means for the drainage of condensation.

* * * * *